United States Patent [19]
Oikawa

[11] Patent Number: 5,896,231
[45] Date of Patent: Apr. 20, 1999

[54] VEHICULAR APPARATUS FOR FORMING A DISPLAY IMAGE DISTANTLY

[75] Inventor: Kohki Oikawa, Omiya, Japan

[73] Assignee: Kansei Corporation, Omiya, Japan

[21] Appl. No.: 08/602,365

[22] Filed: Feb. 16, 1996

[30] Foreign Application Priority Data

Feb. 17, 1995 [JP] Japan ................. 7-029055

[51] Int. Cl.$^6$ ................................ G02B 27/14
[52] U.S. Cl. .................. 359/631; 359/633; 359/839; 359/850; 353/14; 116/304
[58] Field of Search ................. 359/630, 631, 359/633, 839, 863, 867, 850; 340/461; 345/7, 9; 353/14; 116/28 R, DIG. 39, 304

[56] References Cited

U.S. PATENT DOCUMENTS 5,161,480 11/1992 Furuya et al. ................. 116/62.1
5,515,122 5/1996 Morishima et al. ................. 359/631

*Primary Examiner*—David C. Nelms
*Assistant Examiner*—Jordan M. Schwartz
*Attorney, Agent, or Firm*—Jacobson, Price, Holman & Stern, PLLC

[57] ABSTRACT

An apparatus is provided for magnifying a display surface of an indicator and forming an image of the display surface at a forward place distant from a driver and other passengers in a motor vehicle. The apparatus comprises an indicator (11), a concave mirror (15), and a half mirror (13). The concave mirror (15) and the half mirror (13) serve to enlarge an image (20) of a display surface (12) of the indicator (11) and form the enlarged image at a forward place distant from a driver and passengers in a vehicle. The apparatus is provided with a cylindrical lens portion (14) by which the magnifying power of the image (20) in right and left directions is set at 1.2 to 2.5 while the magnifying power in up and down directions is set at 1.2 to 1.6.

3 Claims, 21 Drawing Sheets

VEHICULAR APPARATUS FOR FORMING A DISPLAY IMAGE DISTANTLY

BACKGROUND OF THE INVENTION

1. Field of the Invention

This invention relates to an apparatus for magnifying a display surface of an indicator, such as a meter or gauge, and forming an enlarged image of the display surface at a forward place distant from a driver and other passengers in a motor vehicle.

2. Description of the Prior Art

Conventionally, a display image magnifying apparatus for a vehicle is known as shown in FIG. 21. In FIG. 21, reference numeral 1 designates an indicator on which information given by a speedometer, a tachometer, a fuel gauge, and the like is displayed, reference numeral 2 designates a half mirror, and reference numeral 3 designates a concave mirror. A beam of light emitted from a display surface 1a of the indicator 1 passes through the half mirror 2 and reaches the concave mirror 3. An image of the display surface 1a enlarged by the concave mirror 3 is formed over the concave mirror 3 as a virtual image. Light from the image is reflected by the half mirror 2 and proceeds toward an eye point of the driver.

As a result of the reflection of the light by the half mirror 2, the image 1b of the display surface 1a is formed at a forward place distant from the driver. Since the image 1b viewed by the driver is enlarged and formed at the distant place, the image 1b is very easy for the driver to discern.

The size of each character in the image 1b is determined such that each character falls within a visual angle of the driver, and the size of the image 1b is determined such that the image 1b is viewed within an eye range of the driver and with both eyes of the driver.

However, in the conventional apparatus, an optical axis 5 is arranged to extend through the eye point of the driver. For this reason, when the image 1b of the display surface 1a is viewed from, for example, an assistant driver's seat (passenger seat) which Is a point other than the eye point of the driver, a direction in which the image 1b is viewed considerably deviates from the optical axis 5. In addition, a distance between the display surface 1a and the concave mirror 3 measured from the eye point of the driver is different from a distance therebetween measured from the assistant driver's seat. This causes distortion of the image 1b. The higher the magnifying power is, the worse the distortion of the image 1b becomes.

Generally, distortion of the image 1b in right and left directions can be corrected by brain action of a viewer so as not to feel a great difficulty in viewing, but distortion thereof in up and down directions cannot be corrected by the brain action and therefore the image 1b is very difficult to discern.

Another magnifying apparatus is known in which a cylindrical lens is disposed between an indicator 1 and a half mirror 2 so as to lower the magnifying power in up and down directions and heighten the magnifying power in right and left directions (see Japanese Patent Application Early Laid-Open Publication No. Hei 4-103437). However, this apparatus is constructed for a driver to easily and clearly view an image of the indicator 1. In the apparatus, no attention is paid to a case in which the image of the indicator 1 is viewed from an assistant driver's seat. For this reason, disadvantageously, the image is very difficult to discern when viewed from the assistant driver's seat.

SUMMARY OF THE INVENTION

It is an object of the present invention to provide a magnifying apparatus used in a motor vehicle, in which an image of an indicator is easy to discern even when the image is viewed from a point other than an eye point of a driver's seat.

The present invention is characterized in that, in a magnifying apparatus comprising an indicator and an optical member for enlarging an image of a display surface of the indicator and forming the image at a forward place distant from a driver and passengers in a vehicle, the apparatus further comprises a magnifying optical means for magnifying the image 1.2 to 2.5 times in right and left directions and magnifying the image 1.2 to 1.6 times in up and down directions.

Further, the present invention is characterized in that, in a magnifying apparatus comprising an indicator, a concave mirror for enlarging and reflecting an image of a display surface of the indicator, and a half mirror disposed between the indicator and the concave mirror, for reflecting a beam of light of the image reflected by the concave mirror toward a driver and passengers in a vehicle, the half mirror is formed of a cylindrical lens by which the image is magnified in right and left directions and, by a combination of the cylindrical lens and the concave mirror, the image is magnified 1.2 to 2.5 times in the right and left directions and 1.2 to 1.6 times in up and down directions.

Further, the present invention is characterized in that, in a magnifying apparatus comprising an indicator, a concave mirror for enlarging and reflecting an image of a display surface of the indicator, and a half mirror disposed between the indicator and the concave mirror, for reflecting a beam of light of the image reflected by the concave mirror toward a driver and passengers in a vehicle, a reflection surface of the half mirror is formed like a cylindrical lens mirror by which the image is magnified in right and left directions and, by a combination of the concave mirror and the reflection surface of the half mirror, the image is magnified 1.2 to 2.5 times in the right and left directions and 1.2 to 1.6 times in up and down directions.

DETAILED DESCRIPTION OF THE EMBODIMENTS

Figure 1:
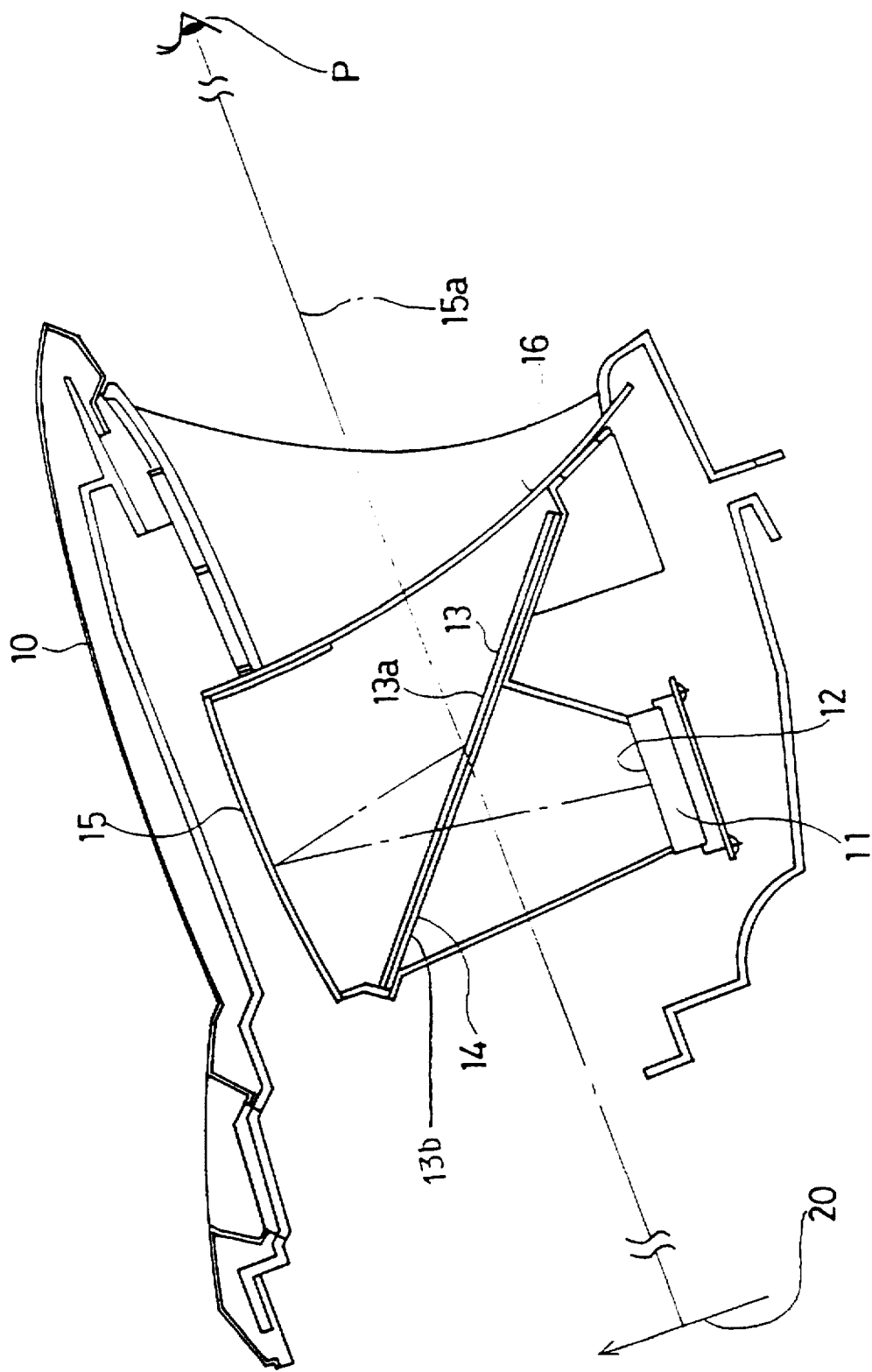
FIG. 1 is a sectional view showing a structure of a magnifying apparatus according to the present invention.
Figure 2:
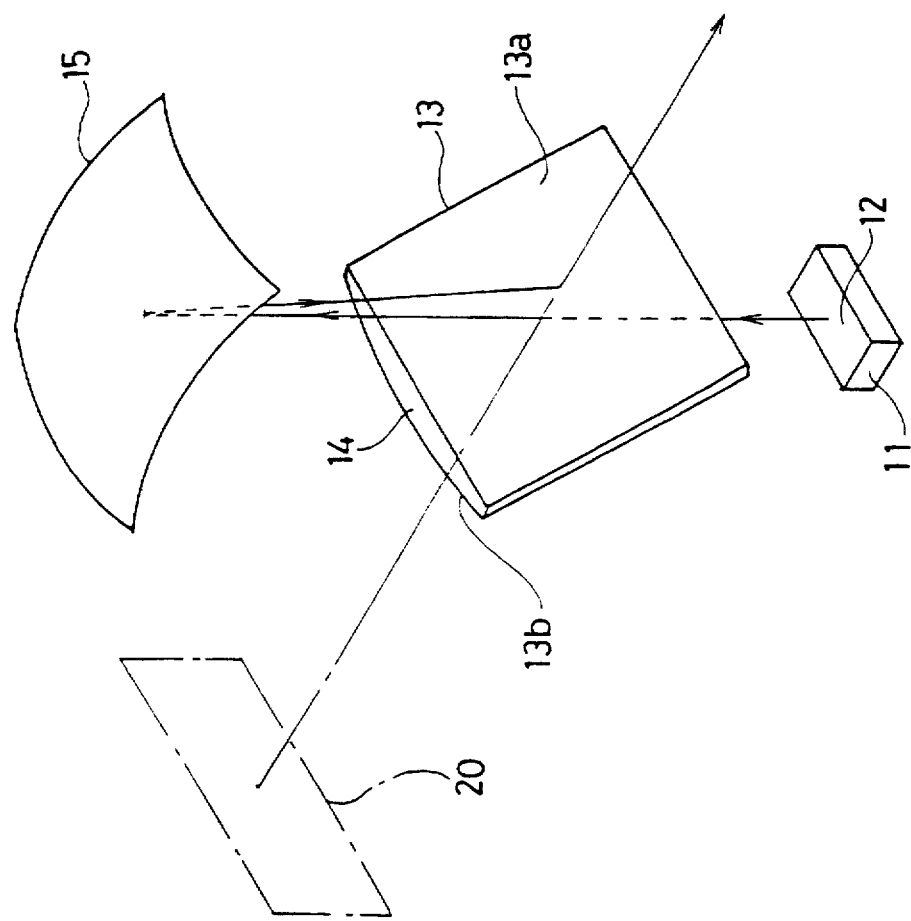
FIG. 2 is a perspective view showing a positional relationship between optical members of the apparatus of FIG. 1.

Embodiments of a magnifying apparatus according to the present invention will be hereinafter described with reference to the attached drawings. In FIGS. 1 and 2, reference numeral 10 designates an instrument panel, and reference numeral 11 designates an indicator counted in the instrument panel 10.

The indicator 11 presents information given by a speedometer, a tachometer, a fuel gauge, and the like on a display surface 12 of the indicator 11. Reference numeral 13 designates a half mirror. A front surface 13a of the half mirror 13 is made flat whereas a back surface 13b thereof is provided with a cylindrical lens portion (magnifying optical means) 14. A cylindrical axis (not shown) of the cylindrical lens portion 14 slants in the same direction as a direction in which the front surface 13a of the half mirror 13 slants. That is, the cylindrical lens portion 14 serves to magnify the display surface 12 only in right and left directions.

Reference numeral 15 designates a concave mirror (magnifying and displaying optical member) by which the display surface 12 of the indicator 11 is magnified and displayed. The concave mirror 15 serves, by itself, to form a virtual image of the display surface 12 which is magnified 1.6 times in right, left, up, and down directions. By a combination of the cylindrical lens portion 14 and the concave mirror 15, a virtual image of the display surface 12 is formed which is magnified 1.6 times in up and down directions and 2.5 times right and left directions. An optical axis 16a of the concave mirror 15 is arranged to pass through an eye point P by reflection of light by the half mirror 13. Reference numeral 16 designates a transparent cover for dust proof.

Action in the above embodiment will now be described.

A beam of light emitted from the display surface 12 of the indicator 11 passes through the half mirror 13 and strikes the concave mirror 15 and then is reflected by the concave mirror 15. By this reflection, a virtual image of the display surface 12 is formed which is magnified 1.6 times in right, left, up, and down directions. However, as a result, the virtual image is magnified 1.6 times in the up and down directions and 2.5 times in the right and left directions because the cylindrical lens portion 14 is formed on the half mirror 13. Light from the virtual image is reflected by the front surface 13a of the half mirror 13 and reaches the eye point P. A display image 20 made of the virtual image is formed behind the half mirror 13.

The display image 20 viewed from the driver's seat which is the position of the eye point P is very easy to discern because the image 20 is magnified 1.6 times in the up and down directions and 2.5 times in the right and left directions and therefore impresses the driver as a wide-screen image superior in display quality. The reason why the image 20 is magnified 2.5 times in the right and left directions is that, due to incidence of extraneous light, the image 20 becomes difficult to discern when magnified more than 2.5 times.

On the other hand, when the image 20 is viewed from the assistant driver's seat, the image 20 is distorted because the image 20 is viewed at an angle with respect to the optical axis 15a. However, distortion in the up and down directions is small because the magnifying power in the up and down directions is no more than 1.6. Distortion of the image 20 in the right and left directions becomes large because the magnifying power In the right and left directions is 2.5, but this is corrected by brain action of the viewer so as not to have much trouble in viewing. Accordingly, the display image 20 becomes very easy to discern because of making a wide-screen impression on the viewer.

In the above embodiment, the cylindrical lens portion 14 formed on the half mirror 13 is used to alter the magnifying power in the up, down, right, and left directions. Instead, without the cylindrical lens portion 14, the curvature of the concave mirror 15 in the up, down, right, and left directions may be altered to set the magnifying power in the up and down directions at 1.6 and set the magnifying Power in the right and left directions at 2.5.

Figure 3:
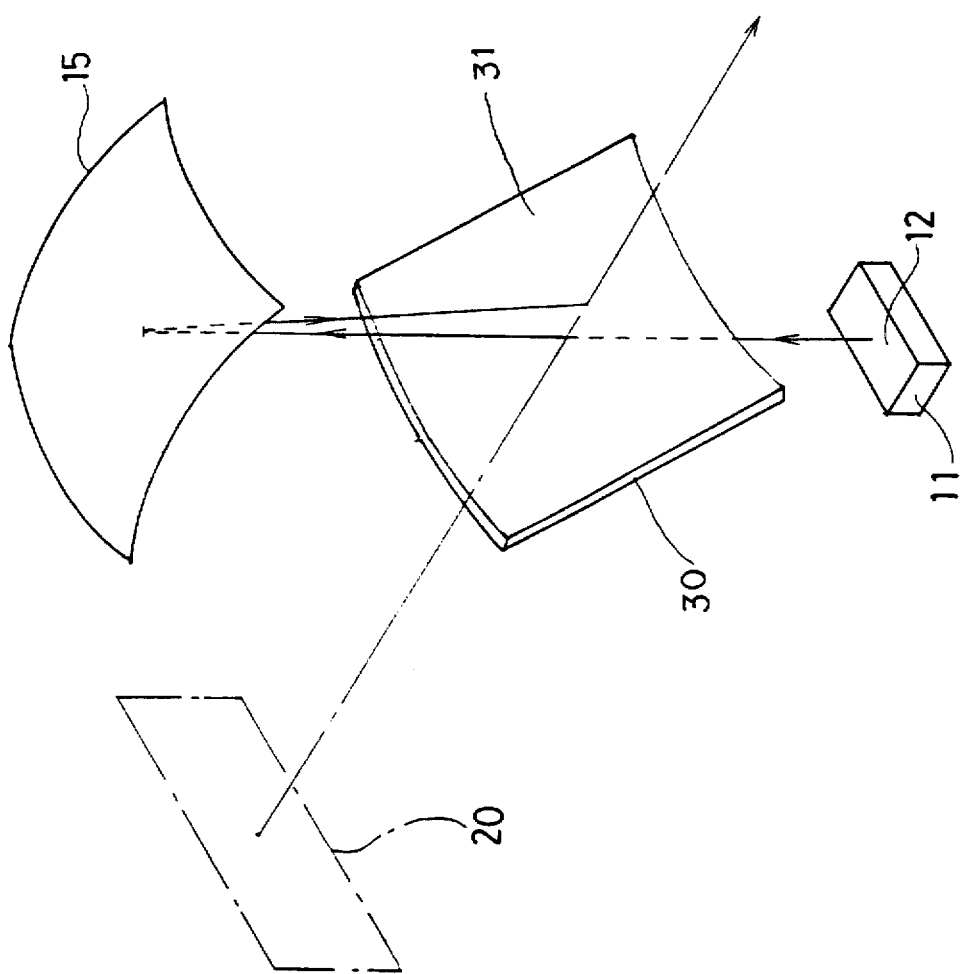
FIG. 3 is a perspective view showing a positional relationship between optical members according to another embodiment.

FIG. 3 shows another embodiment. In FIG. 3, reference numeral 30 designates a half concave mirror (cylindrical mirror) whose front surface 31 is formed cylindrically concave. The half concave mirror (cylindrical mirror) 30 serves to magnify the display surface 12 only in the right and left directions, not in the up and down directions. By a combination of the concave mirror 15 and the half concave mirror 30, the display surface 12 of the indicator 11 is magnified 1.6 times in the up and down directions and 2.5 times in the right and left directions.

A description will now be given of a case in which the display image 20 is viewed from both the driver's seat and the assistant driver's seat while altering the magnifying power in the up, down, right, and left directions.

Figure 4:
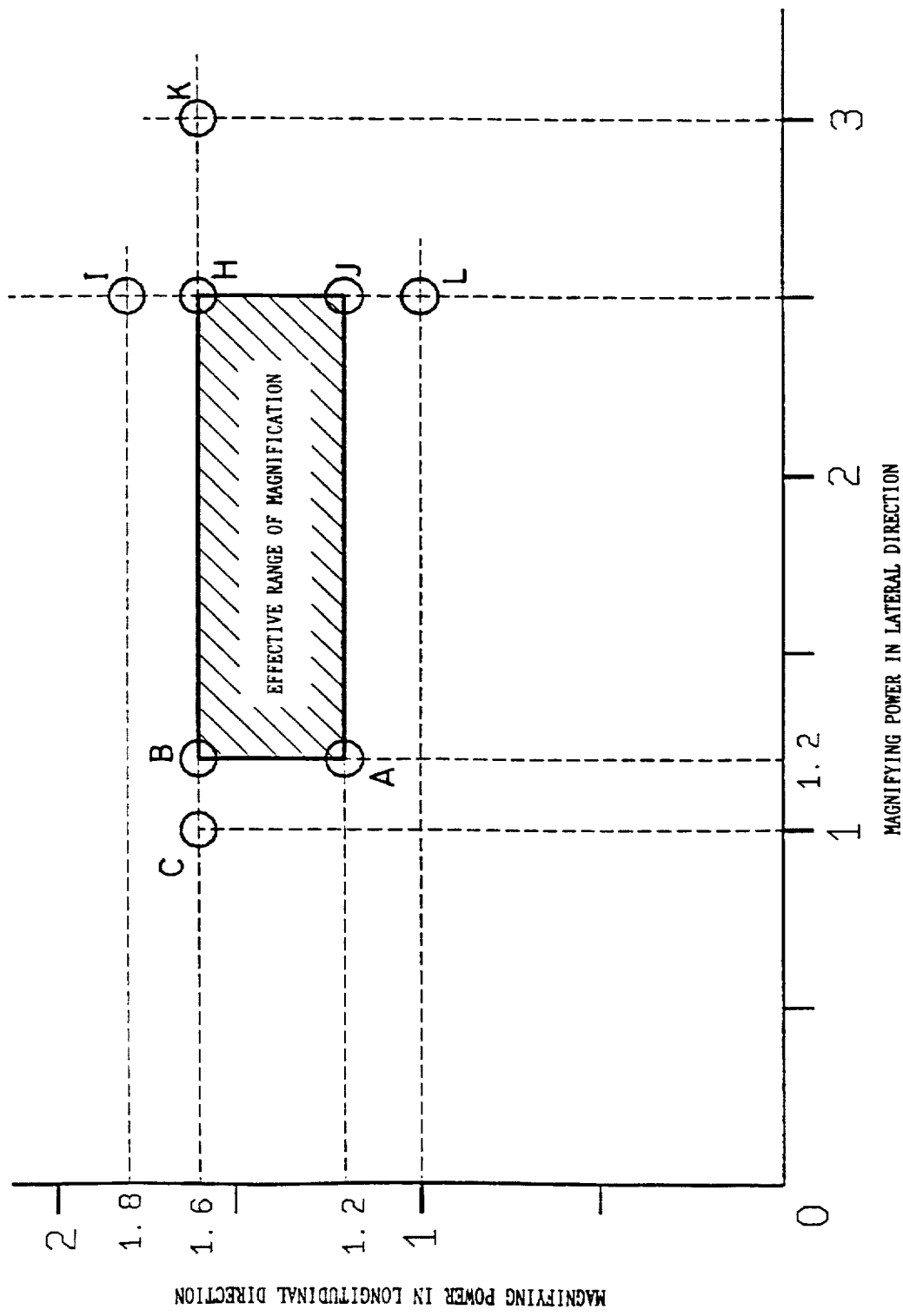
FIG. 4 is a descriptive drawing of magnifying power in up and down directions and magnifying power in right and left directions.
Figure 5:
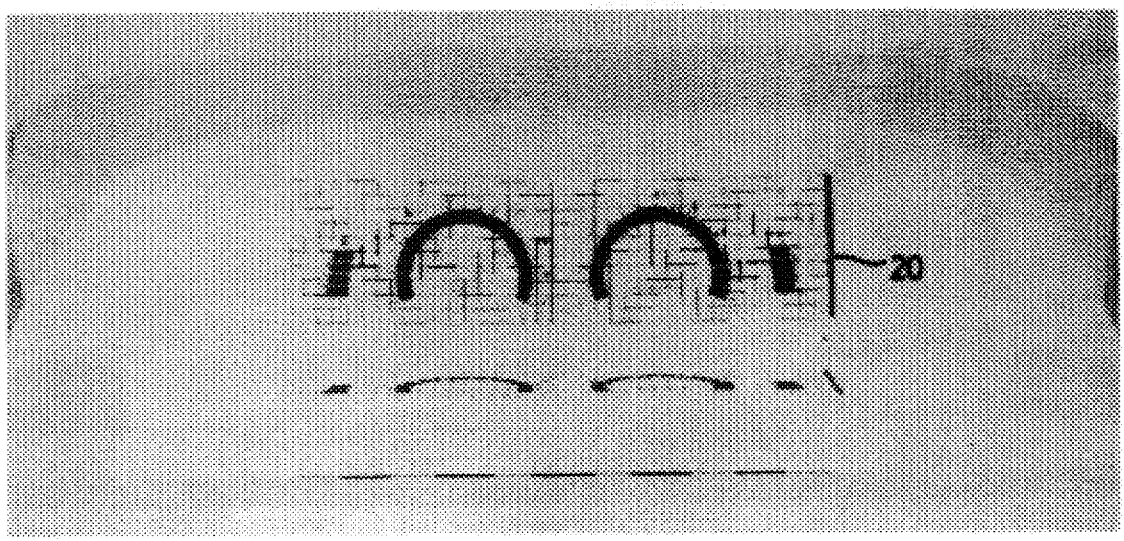
FIG. 5 is a descriptive drawing of a display image viewed from a driver's seat.
Figure 6:
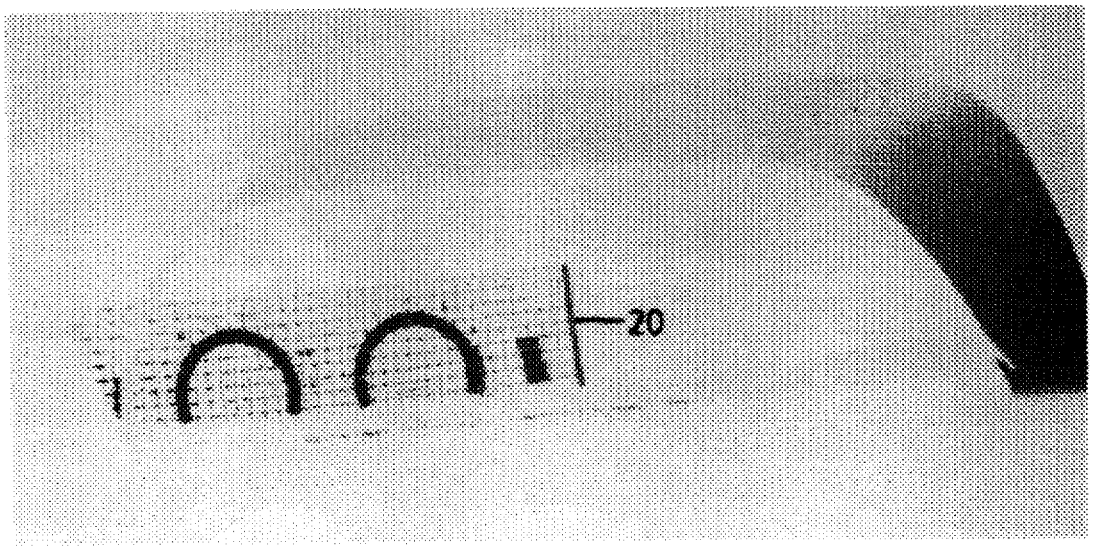
FIG. 6 is a descriptive drawing of the display image viewed from an assistant driver's seat.

In the case of point A shown in FIG. 4, in which the magnifying power in the up and down directions is 1.2 and the magnifying power in the right and left directions is 1.2, the display image viewed from the driver's seat is shown in FIG. 5, and the display image viewed from the assistant driver's seat is shown in FIG. 6. As shown in FIG. 5'the image 20 is magnified 1.2 times in the up, down, right, left directions, and therefore the image 20 is easy to discern. On the other hand, as shown in FIG. 6, when the image 20 is viewed from the assistant driver's seat, the image 20 is also easy to discern because the magnifying power In the up, down, right, left directions is small and therefore distortion in the up, down, right, left directions is small.

Figure 7:
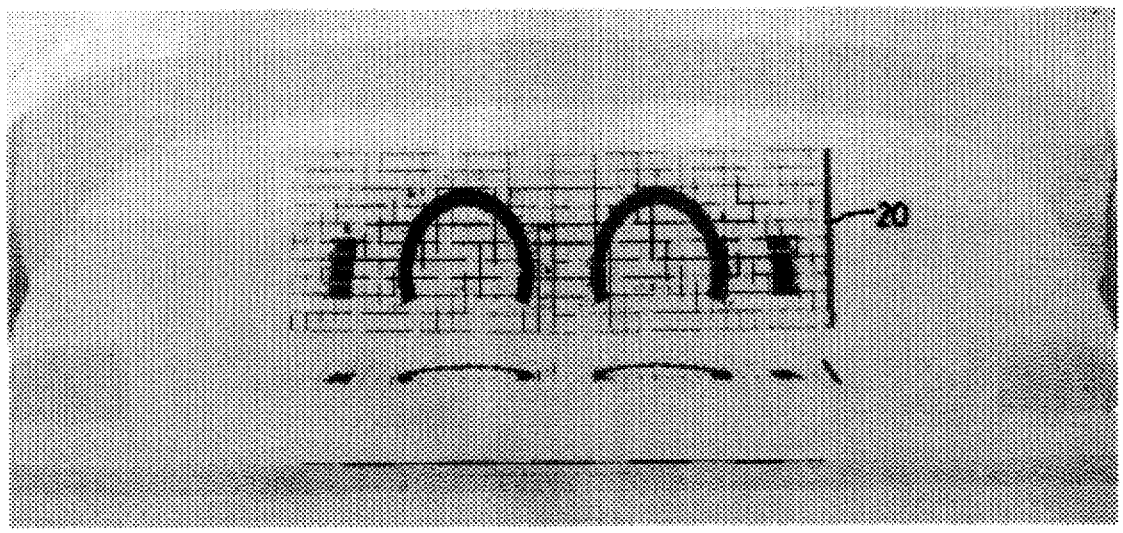
FIG. 7 is a descriptive drawing of the display image viewed from the driver's seat.
Figure 8:
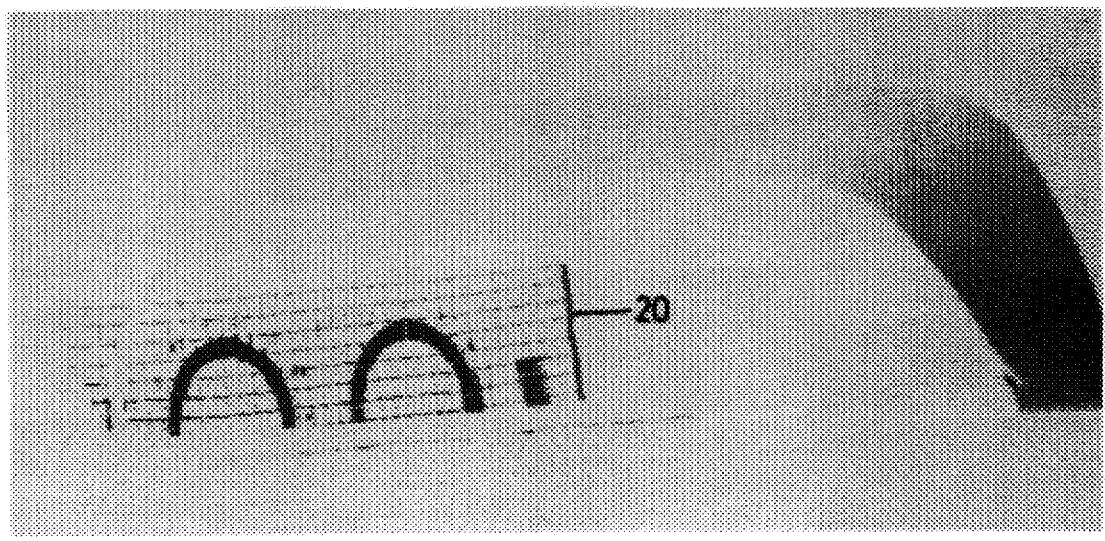
FIG. 8 is a descriptive drawing of the display image viewed from the assistant driver's seat.

In the case of point B shown in FIG. 4, in which the magnifying power in the up and down directions is 1.6 and the magnifying power in the right and left directions is 1.2, the display image viewed from the driver's seat is shown in FIG. 7, and the display image viewed from the assistant driver's seat is shown in FIG. 8. As shown in FIG. 7, the image 20 is magnified 1.6 times in the up and down directions and 1.2 times in the right and left directions, and therefore the image 20 is easy to discern. On the other hand, as shown in FIG. 8, when the image 20 is viewed from the assistant driver's seat, the image 20 is also easy to discern because the magnifying power in the up and down directions is not so large and therefore distortion in the up and down directions is small.

Figure 9:
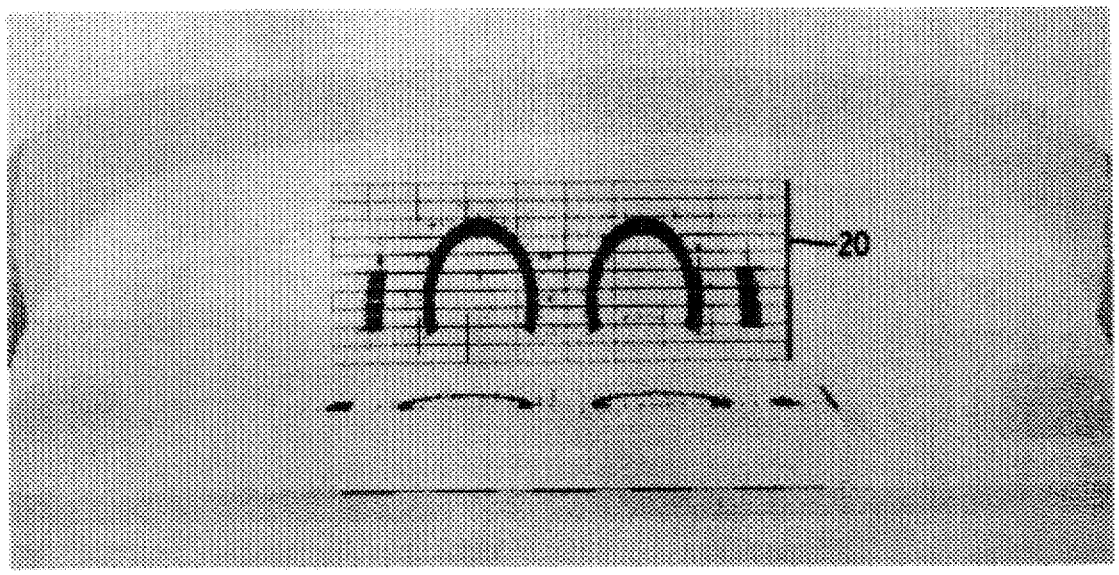
FIG. 9 is a descriptive drawing of the display image viewed from the driver's seat.
Figure 10:
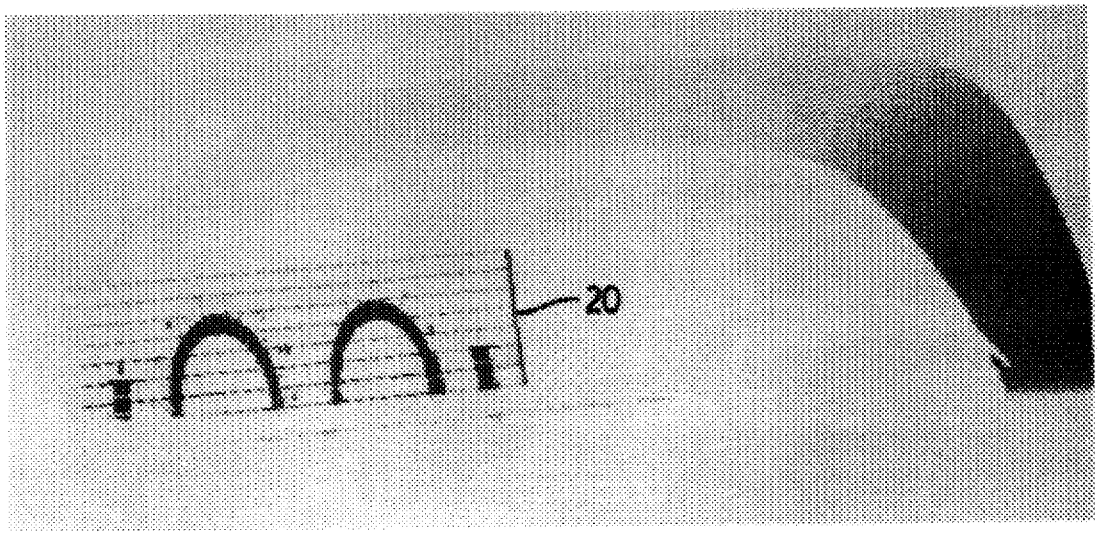
FIG. 10 is a descriptive drawing of the display image viewed from the assistant driver's seat.

In the case of point C in which the magnifying power in the up and down directions is 1.6 and the magnifying power in the right and left directions is 1, the display image viewed from the driver's seat is shown in FIG. 9, and the display image viewed from the assistant driver's seat is shown in FIG. 10. As shown in FIG. 9, the image 20 is magnified 1 time in the right and left directions, and therefore the image 20 is small and difficult to discern. On the other hand, as shown In FIG. 10, when the image 20 is viewed from the assistant driver's seat, the image 20 is small and difficult to discern regardless of small distortion of the image 20.

Figure 11:
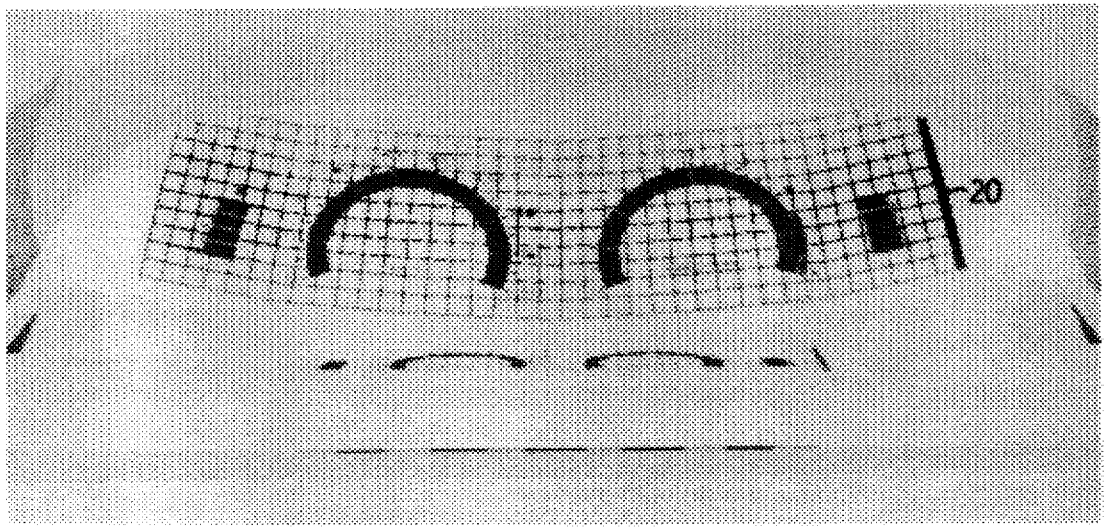
FIG. 11 is a descriptive drawing of the display image viewed from the driver's seat.
Figure 12:
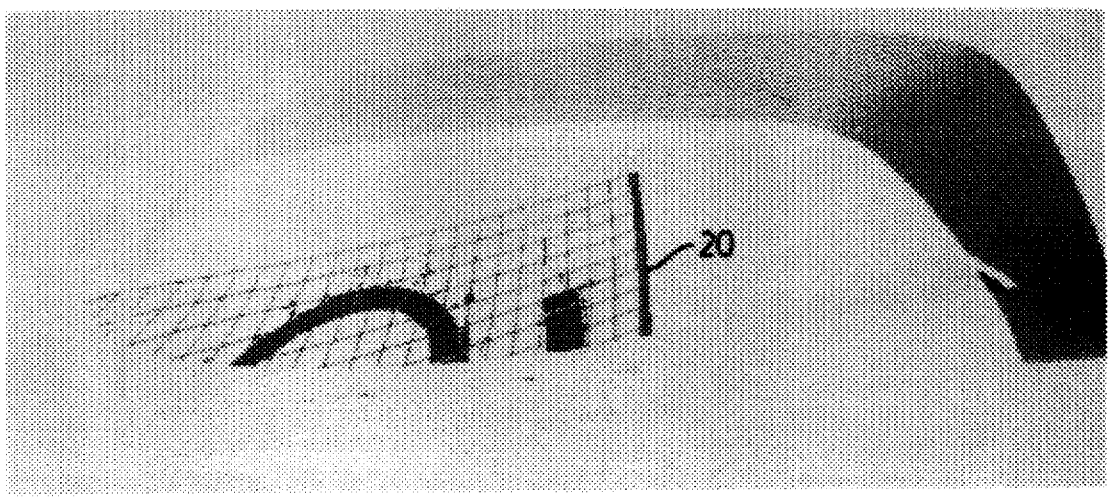
FIG. 12 is a descriptive drawing of the display image viewed from the assistant driver's seat.

In the case of point H in which the magnifying power in the up and down directions is 1.6 and the magnifying power in the right and left directions is 2.5, the display image viewed from the driver's seat is shown in FIG. 11, and the display image viewed from the assistant driver's seat is shown in FIG. 12. As shown in FIG. 11, the image 20 is magnified 1.6 times in the up and down directions and 2.5 times in the right and left directions, and therefore the image 20 is large and very easy to discern. On the other hand, as shown in FIG. 12, when the image 20 is viewed from the assistant driver's seat, the image 20 is large and very easy to discern because the magnifying power in the up and down directions is not so large and therefore distortion in the up and down directions is small though a part of one gauge does not appear in the image 20.

Figure 13:
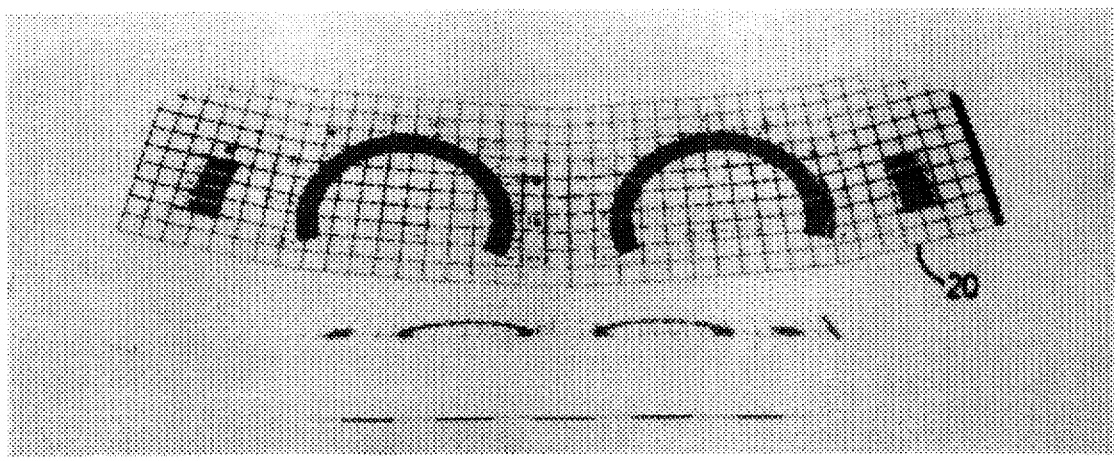
FIG. 13 is a descriptive drawing of the display image viewed from the driver's seat.
Figure 14:
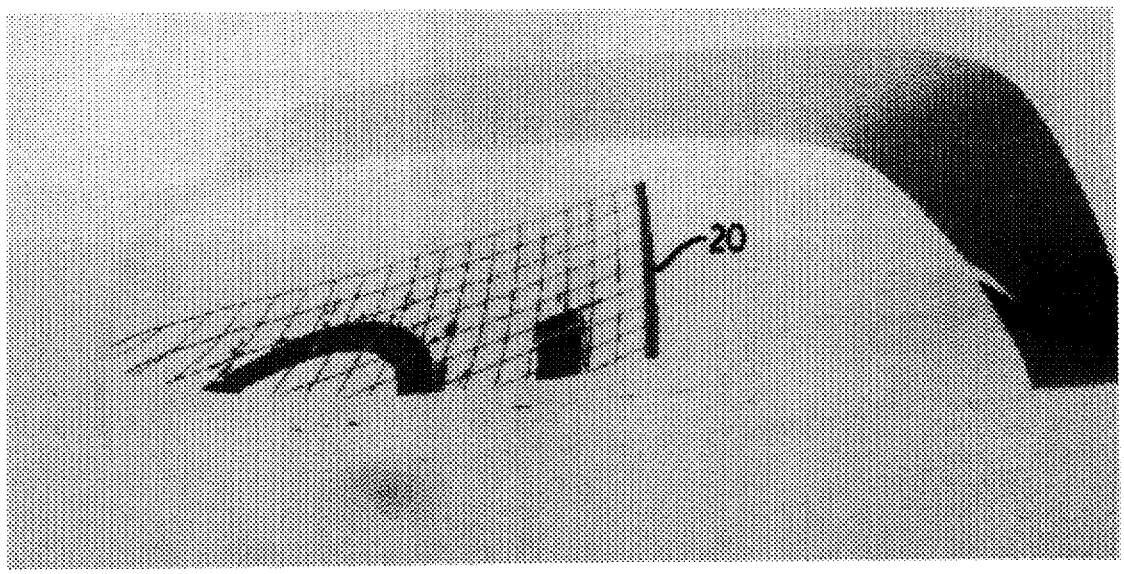
FIG. 14 is a descriptive drawing of the display image viewed from the assistant driver's seat.

In the case of point K in which the magnifying power in the up and down directions is 1.6 and the magnifying power in the right and left directions is 3.0, the display image viewed from the driver's seat is shown in FIG. 13, and the display image viewed from the assistant driver's seat is shown in FIG. 14. As shown in FIG. 13, the image 20 is large. On the other hand, as shown In FIG. 14, when the image 20 is viewed from the assistant driver's seat, only a part of one gauge appears in the image 20. In addition, the image 20 is very difficult to discern because the image 20 is considerably distorted in the up, down, right, and left directions on the left-hand side of the image 20.

Figure 15:
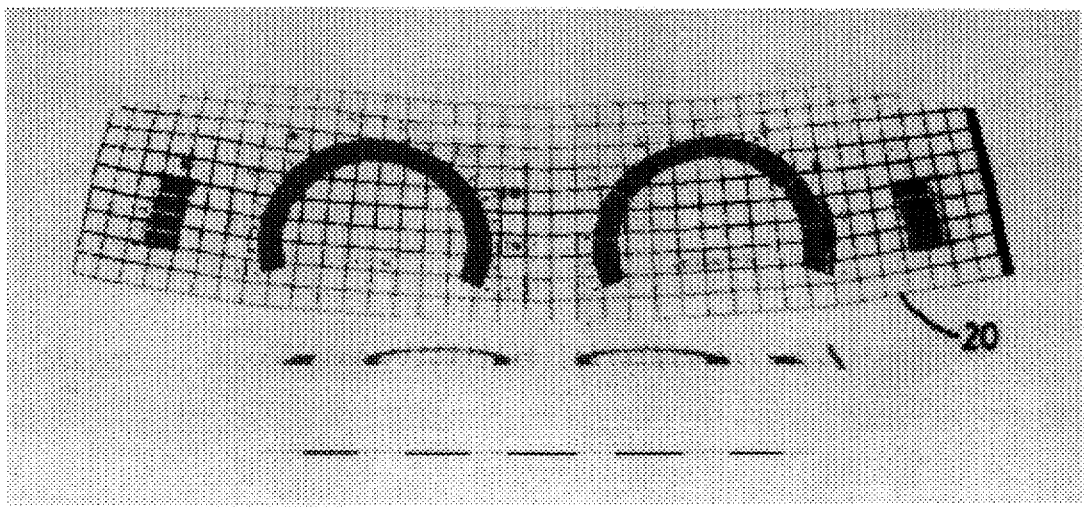
FIG. 15 is a descriptive drawing of the display image viewed from the driver's seat.
Figure 16:
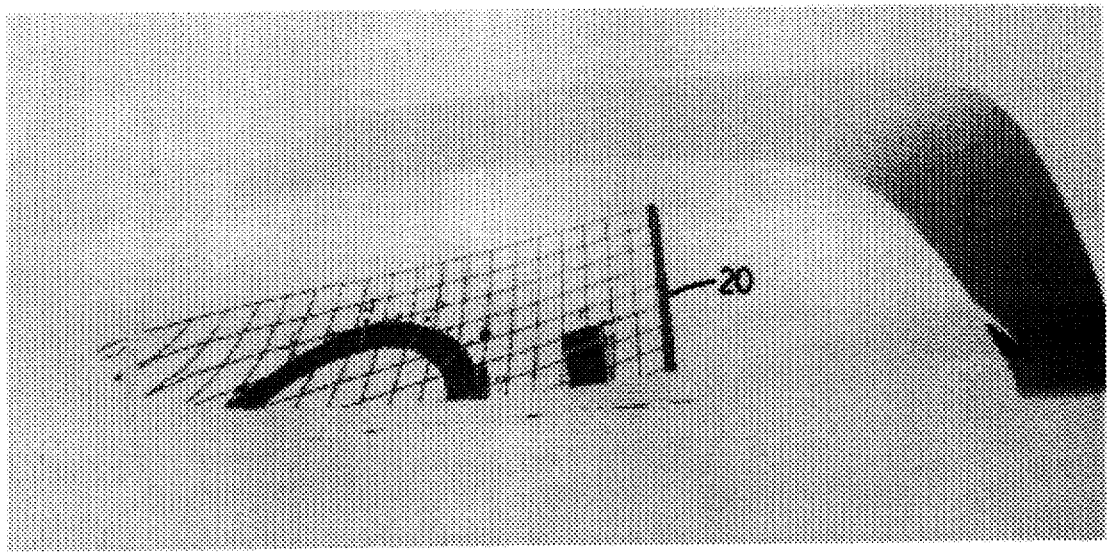
FIG. 16 is a descriptive drawing of the display image viewed from the assistant driver's seat.

In the case of point I in which the magnifying power in the up and down directions is 1.8 and the magnifying power in the right and left directions is 2.5, the display image viewed from the driver's seat is shown in FIG. 15, and the display image viewed from the assistant driver's seat is shown in FIG. 16. As shown in FIG. 15, the image 20 is large. On the other hand, as shown in FIG. 16, when the image 20 is viewed from the assistant driver's seat, the image 20 is very difficult to discern because the image 20 is distorted in the up and down directions and, especially on the left-hand side thereof, it is considerably distorted in all the directions.

Figure 17:
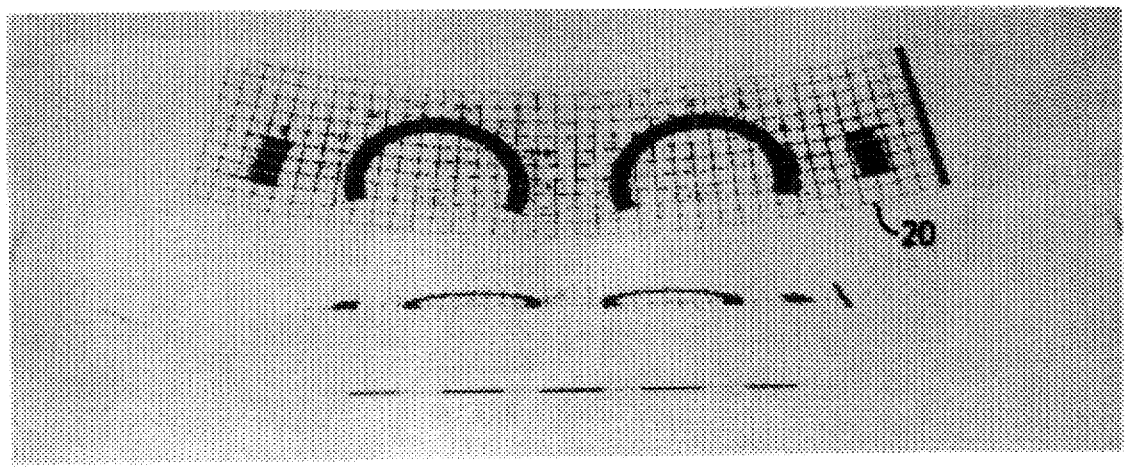
FIG. 17 is a descriptive drawing of the display image viewed from the driver's seat.
Figure 18:
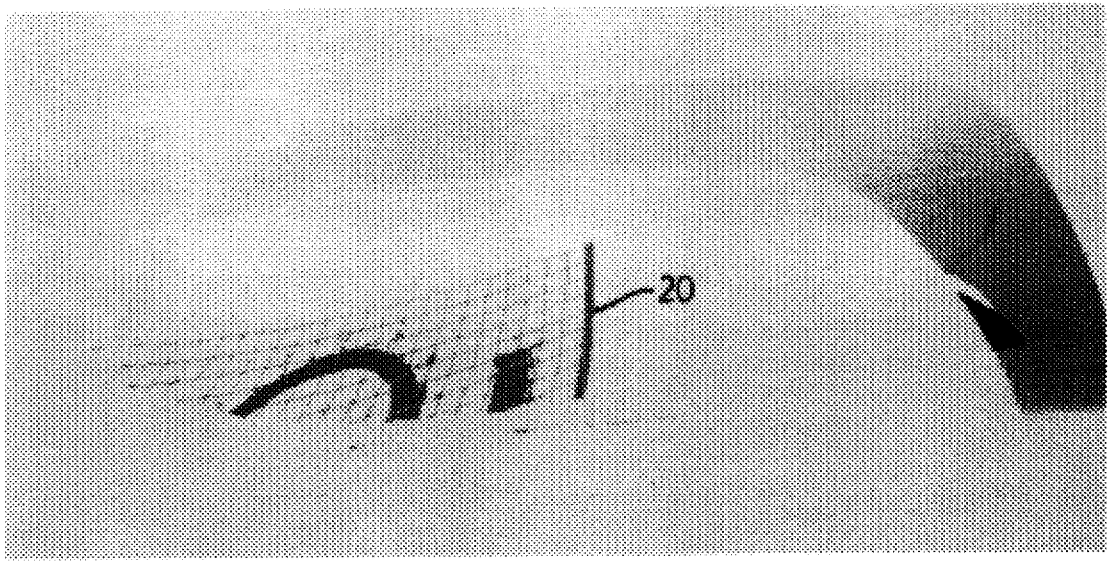
FIG. 18 is a descriptive drawing of the display image viewed from the assistant driver's seat.

In the case of point J in which the magnifying power in the up and down directions is 1.2 and the magnifying power in the right and left directions is 2.5, the display image viewed from the driver's seat is shown in FIG. 17, and the display image viewed from the assistant driver's seat is shown in FIG. 18. As shown in FIG. 17, the image 20 is magnified 1.2 times in the up and down directions and 2.5 times in the right and left directions, and therefore the image 20 is large and very easy to discern. On the other hand, as shown in FIG. 18, when the image 20 is viewed from the assistant driver's seat, the image 20 is large and very easy to discern because the magnifying power it the up and down directions is not so large and therefore distortion in the up and down directions is small though a part of the gauge does not appear in the image 20.

Figure 19:
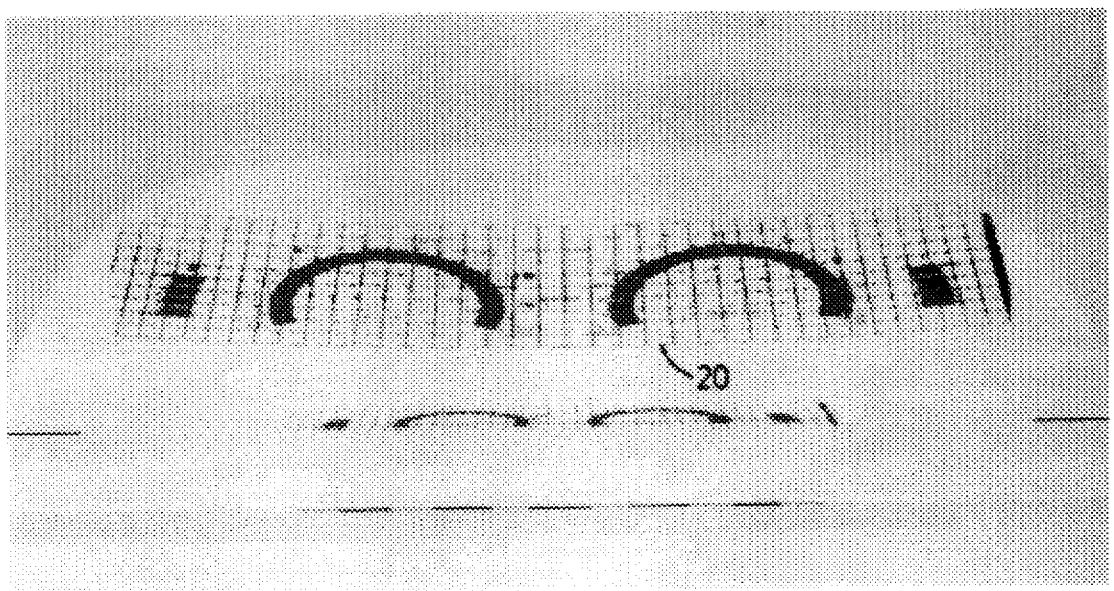
FIG. 19 is a descriptive drawing of the display image viewed from the driver's seat.
Figure 20:
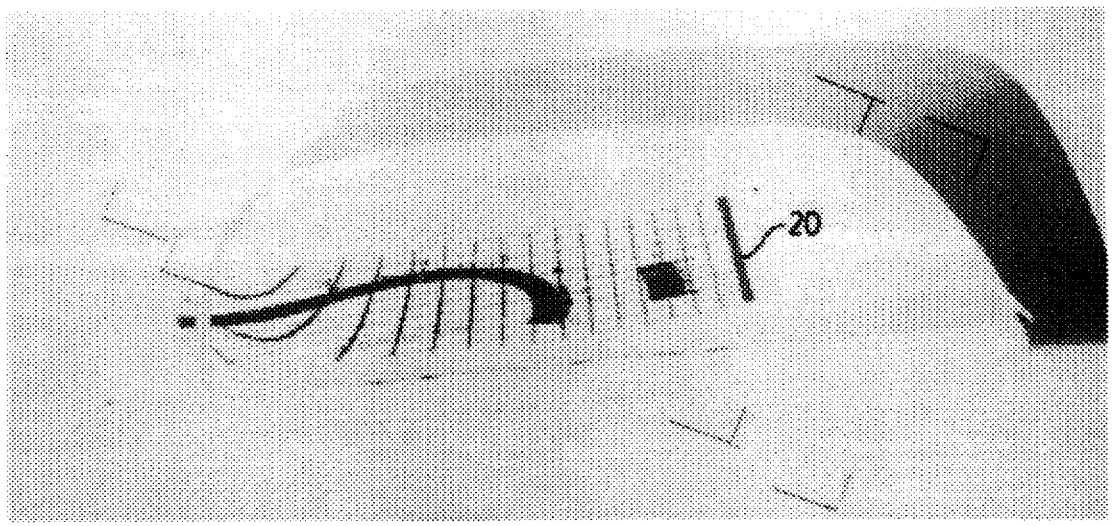
FIG. 20 is a descriptive drawing of the display image viewed from the assistant driver's seat.
Figure 21:
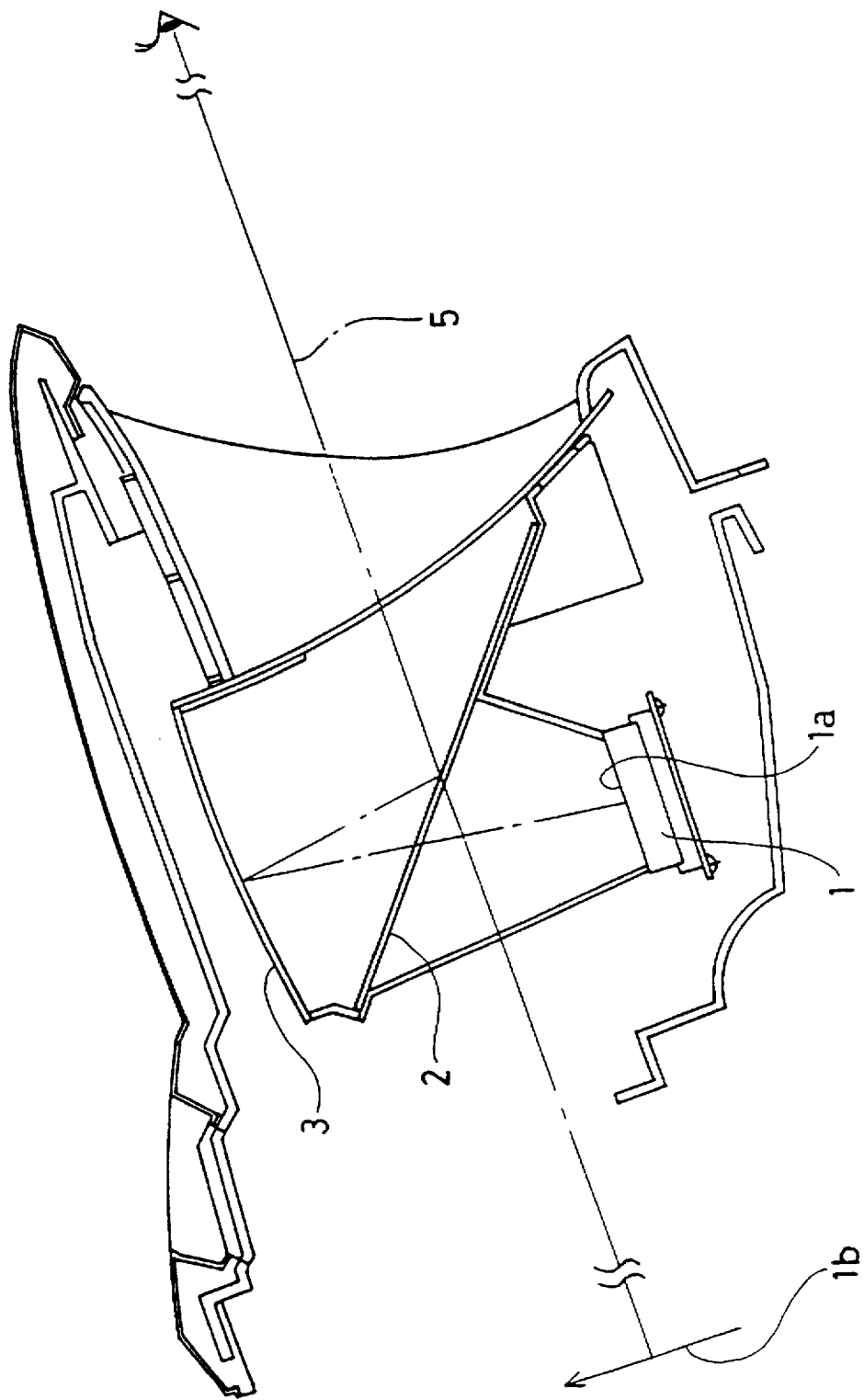
FIG. 21 is a sectional view showing a structure of a conventional magnifying apparatus.

In the case of point L in which the magnifying power In the up and down directions is 1 and the magnifying power in the right and left directions is 2.5, the display image viewed from the driver's seat is shown in FIG. 19, and the display image viewed from the assistant driver's seat is shown in FIG. 20. As shown in FIG. 19, the image 20 is easy to discern because the image 20 is magnified 2.5 times in the right and left directions. On the other hand, as shown in FIG. 20, when the image 20 is viewed from the assistant driver's seat, the image 20 is very difficult to discern because both the gauges in the image 20 which are separately disposed on the right-hand and left-hand sides respectively look like contiguous ones.

In conclusion, the display image 20 viewed from both the driver's seat and the assistant driver's seat is easy to discern if the magnifying power falls within the range indicated by the slant lines in FIG. 4.

What is claimed is:

1. An apparatus used in a motor vehicle, for forming a display image distantly, said apparatus comprising:

an indicator;

a first optical member for enlarging an image of a display surface of said indicator and forming the image of said display surface as a virtual image; and a second optical member for magnifying the virtual image, wherein the first and second optical members magnify the image of the display surface 1.2 to 2.5 times in right and left directions and magnify the image 1.2 to 1.6 times in up and down directions to form a display image;

whereby the display image is displayed as the virtual image having a reduced distortion in up and down directions when viewed from an assistant driver's seat.

2. An apparatus for magnifying a display surface of an indicator and forming a virtual image of the display surface, said apparatus comprising: an indicator; a concave mirror for magnifying a display surface of said indicator and forming a virtual image thereof; and a half mirror, disposed between said indicator and said concave mirror, for reflecting a beam of light of the virtual image reflected by said concave mirror toward a driver in a motor vehicle;

wherein one surface of said half mirror is formed in the form of a cylindrical lens by which the virtual image is magnified in right and left directions and, by a combination of said cylindrical lens and said concave mirror, the virtual image is magnified 1.2 to 2.5 times in right and left directions and 1.2 to 1.6 times in up and down directions;

whereby the virtual image is displayed which has a reduced distortion in up and down directions when viewed from an assistant driver's seat.

3. An apparatus for magnifying a display surface of an indicator and forming a virtual image of the display surface, said apparatus comprising: an indicator; a concave mirror for magnifying a display surface of said indicator and forming a virtual image thereof; and a half mirror, disposed between said indicator and said concave mirror, for reflecting a beam of light of the virtual image reflected by said concave mirror toward a driver in a motor vehicle;

wherein a reflection surface of said half mirror comprises a cylindrical lens by which the virtual image is magnified only in right and left directions and, by a combination of said concave mirror and the reflection surface of said half mirror, the image is magnified 1.2 to 2.5 times in right and left directions and 1.2 to 1.6 times in up and down directions;

whereby the virtual image is displayed which has a reduced distortion in up and down directions when viewed from an assistant driver's seat.

* * * * *